United States Patent [19]

Kitamura et al.

[11] 4,165,217
[45] Aug. 21, 1979

[54] HALOHYDROCARBON TREATMENT OF A GLYCOL AND WASTE DYE LIQUOR FOLLOWED BY WATER EXTRACTION OF THE GLYCOL

[75] Inventors: Kazuo Kitamura, Mukou; Fumiki Takabayashi, Takatsuki; Fumio Shibata, Uji; Kaname Watabe, Takatsuki; Toshinori Azumi, Ibaraki, all of Japan

[73] Assignee: Teijin Limited, Osaka, Japan

[21] Appl. No.: 527,307

[22] Filed: Nov. 26, 1974

Related U.S. Application Data

[63] Continuation-in-part of Ser. No. 357,896, May 7, 1973, abandoned.

[30] Foreign Application Priority Data

May 9, 1972 [JP] Japan .................................. 47-45052

[51] Int. Cl.$^2$ .............................................. D06P 5/00
[52] U.S. Cl. .......................................... 8/81; 8/94 A; 8/173; 8/174; 8/175
[58] Field of Search ........................ 8/81, 174, 175, 94

[56] References Cited

U.S. PATENT DOCUMENTS

| | | | |
|---|---|---|---|
| 1,297,046 | 3/1919 | Wall | 8/81 |
| 1,791,990 | 2/1931 | Whitehead | 8/102 |
| 2,235,234 | 3/1941 | Moncrief | 8/81 |
| 2,445,323 | 7/1948 | Galatioto | 8/81 UX |
| 3,523,749 | 8/1970 | MacLeod | 8/54.2 |
| 3,667,898 | 6/1972 | Bergman | 8/94 |
| 3,809,536 | 5/1974 | Silverpiper | 8/173 |

OTHER PUBLICATIONS

Milicevic, J. Amer. Assoc. of Tex. Chem. and Col., vol. 2, No. 5, 1970, pp. 87–90, 95–98.

*Primary Examiner*—Donald Levy
*Attorney, Agent, or Firm*—Sherman & Shalloway

[57] ABSTRACT

A method for treating a wash waste liquor, which comprises treating fibers which have been dyed by applying a dye liquor containing a solution or dispersion of a non-ionic dye in a high boiling water-soluble organic medium or a mixture of it with a low boiling medium and then heating the fibers, with a low boiling organic solvent capable of dissolving the high boiling water-soluble organic medium, thereby to wash out the unfixed dye and the high boiling water-soluble organic medium remaining on the surface of the fibers; concentrating the wash waste liquor by evaporating at least a part of the low boiling organic solvent contained in the waste liquor; and extracting the high boiling organic medium from the concentrate using water.

5 Claims, 1 Drawing Figure

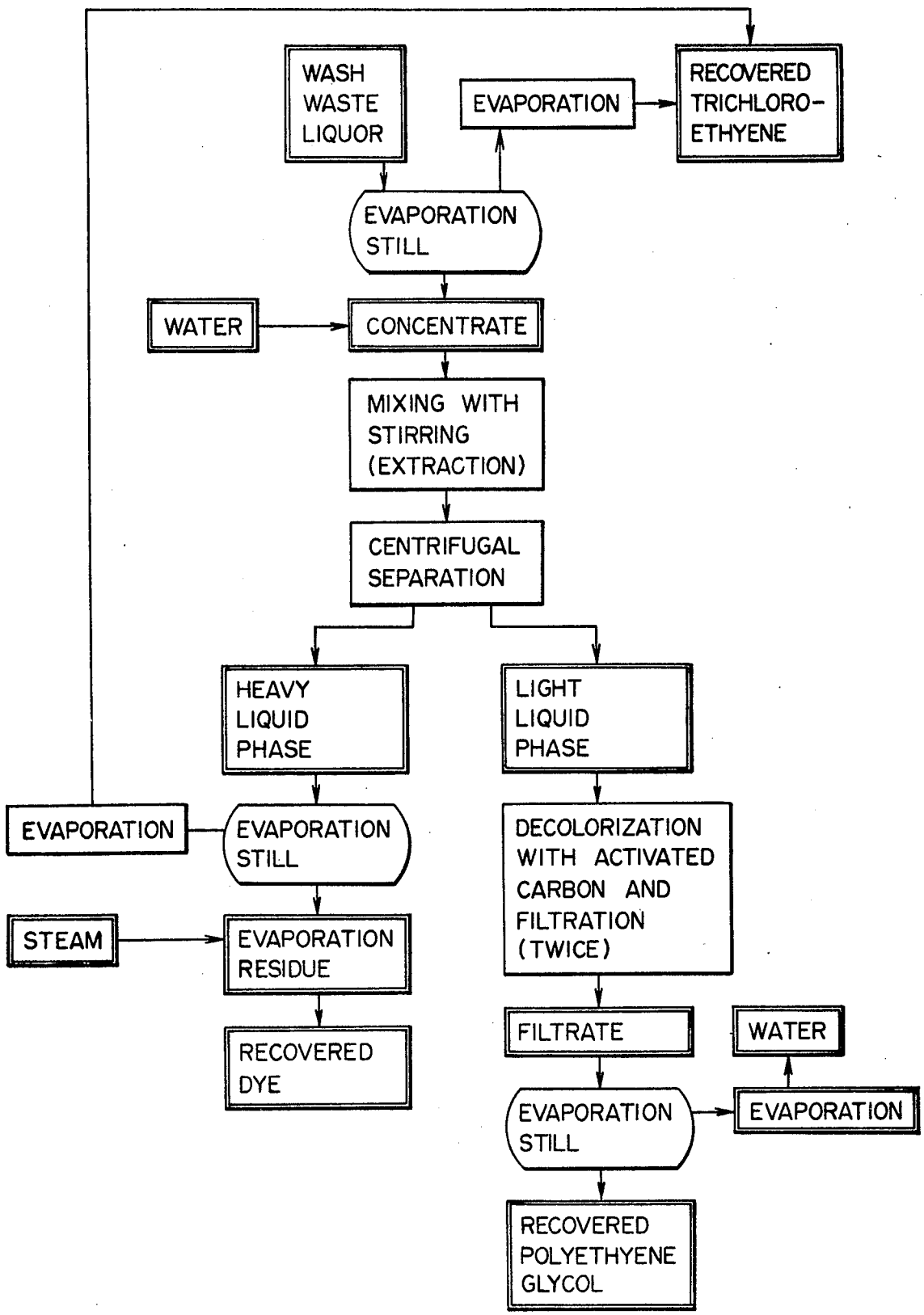

HALOHYDROCARBON TREATMENT OF A GLYCOL AND WASTE DYE LIQUOR FOLLOWED BY WATER EXTRACTION OF THE GLYCOL

This is a continuation-in-part application of application Ser. No. 357,896, filed May 7, 1973, now abandoned.

This invention relates to a method for treating a wash waste liquor. More specifically, the invention relates to a method for recovering valuable components from a waste liquor which has resulted from the washing of fibers dyed by applying a dye liquor containing a non-ionic dye thereto and then heating the fibers.

A method of dyeing has previously been known which comprises applying to synthetic or semi-synthetic fibers a dye liquor prepared by dissolving or dispersing a non-ionic dye such as a disperse dye in a high boiling water-soluble organic medium such as polyethylene glycol or a mixture of it with a low boiling medium such as water or a halogenated hydrocarbon, and then heating the fibers to fix the dye thereto. It is customary in this method to remove the unfixed dye and the high boiling water-soluble organic medium remaining on the fibers by washing, and discard it. Up to the present, no efficient method for recovering them for reuse has been proposed.

U.S. Pat. No. 3,667,898, for instance, discloses a process for dyeing textile materials in which dispersed dyes are applied to the textiles in a mixture of a low boiling medium having a boiling point of about 40° C. which includes lower alcohols, halogenated hydrocarbons and an optional higher boiling solvent such as glycols, polyols and esters and ethers thereof. The patent teaches further to scour the high boiling solvent from the fibers with a low boiling solvent and remove the lower boiling solvent by passing the scoured fiber through a vapor zone of the low boiling solvent.

However, this patent does not in the least teach or suggest an effective method for recovering the high boiling solvent, the low boiling medium and the dye altogether.

Needless to say, to discard the wash waste liquor to sewage results in the loss of the useful dye and organic solvent, and also causes environmental pollution. It has therefore been desired to recover these useful components.

Accordingly, an object of this invention is to provide a method for treating a wash waste liquor, which can meet such a demand.

According to this invention, there is provided a method for treating a wash waste liquor which comprises (1) treating fibers which have been dyed by applying a dye liquor containing a solution or dispersion of a non-ionic disperse or oil-soluble dye in a high boiling water-soluble organic medium selected from the group consisting of polyalkylene glycols and alkyl ethers of polyalkylene glycols or a mixture of it with a low boiling medium selected from the group consisting of water and halogenated hydrocarbons, with a low boiling halogenated hydrocarbon capable of dissolving the high boiling water-soluble organic medium thereby to wash out the unfixed dye and the high boiling water-soluble organic medium remaining on the surfaces of the fibers; (2) concentrating the wash waste liquor by evaporating the low boiling halogenated hydrocarbon contained therein with the content of said halogenated hydrocarbon in the residual concentrate becomes substantially 30 to 90% by weight; (3) mixing the resulting concentrate consisting of the high boiling water-soluble organic medium, the dye and the low boiling halogenated hydrocarbon with 0.8 to 20 parts by weight of water, per part by weight of the high boiling water-soluble organic medium in the residual concentrate to extract the high boiling water-soluble organic medium, thereby to separate it into a phase consisting of an aqueous solution of the high boiling water-soluble organic medium and a phase consisting of the low boiling halogenated hydrocarbon and the dye dissolved or dispersed therein; and (4) thereafter separating the two phases, recovering the low boiling halogenated hydrocarbon by evaporation and obtaining the dye as residue from the phase consisting of the low boiling halogenated hydrocarbon and the dye.

The present invention makes it now possible, in extracting the high boiling water-soluble organic medium, to recover all the components in an effective manner by an exquisite combination of techniques consisting of a partial evaporation of the low boiling halogenated hydrocarbon from the wash waste liquor, and addition of an optimum amount of water to the residual concentrate.

This method will be described below with reference to each step.

The first step of washing is performed using an apparatus generally known in the art. The material to which this step can be applied in accordance with this invention includes, for example, polyesters, polyamides, polyacrylonitrile, polyvinyl chloride, diacetate, or triacetate fibers which have been dyed by applying a dye liquor comprising a solution or dispersion of a non-ionic dye in a high boiling water-soluble organic medium or a mixture of the high boiling water-soluble organic medium with a low boiling medium selected from the group consisting of water and halogenated hydrocarbons thereto and then heating the fibers. The high boiling water-soluble organic solvent has a boiling point higher than the heating temperature (usually about 180° C.) for dye fixing in the solvent dyeing process.

The high boiling water-soluble organic medium to be used in the present invention is at least one member selected from the group consisting of polyalkylene glycols such as diethylene glycol, triethylene glycol, tetraethylene glycol or polyethylene glycol; alkyl ethers of polyalkylene glycols such as methyl carbitol, ethyl carbitol or triethylene glycol dimethyl ether. Of these, preferred are polyalkylene glycols, inter alia, polyethylene glycols.

The dye to be used in the present invention is a dye which does not contain in the molecule a group dissociable in water; that is to say, a disperse dye or oil soluble dye.

The low boiling organic solvent used for washing out the remaining unfixed dye and the high boiling water-soluble organic medium is selected from low boiling halogenated hydrocarbons such as perchloroethylene, 1,2-difluoro-1,1,2,2-tetrachloroethane, 1,2,2-trifluoro-1,1,2-trichloroethane, 1,1,1-trichloroethane, chloroform or trichloroethylene. Chlorinated hydrocarbons are preferred because of their reduced risk of flammability and easy handling. Above all, trichloroethylene and 1,1,1-trichloroethane are especially preferred because of their high ability to dissolve the high boiling water-soluble organic media and the non-ionic dye. Washing is performed under conditions such that the high boiling water-soluble medium and the dye can be completely washed out without consequent damage of the fibers. It is generally preferred that the low boiling organic solvent be contacted with the fibers at a temperature lower than the boiling point of the solvent for example, about 10° C. lower than it, and washing be completed within 30 seconds to 5 minutes.

In the second step (concentration step), the low boiling halogenated hydrocarbon contained in the wash waste liquor is evaporated to concentrate the waste liquor until the content of said halogenated hydrocarbon becomes 30 to 90%, preferably 50 to 85%, more preferably 60 to 80%, by weight.

In case the concentration exceeds 90% by weight, when the waste liquor is subjected to the third step (extraction with water), it becomes difficult to distribute the high boiling water-soluble organic solvent into water because the waste liquor contains a great quantity of the low boiling organic solvent, and the water extraction efficiency is reduced.

On the other hand, if the concentration is less than 30% by weight, the viscosity of the residual concentrate becomes larger whereby the extraction procedures become more difficult. A longer period of time is also required in this case for evaporation of a larger amount of the low boiling organic solvent, and the stability of said solvent lowers at the same time. Accordingly, it is preferred to keep the concentration above 30% by weight.

In the third step (extraction step), 0.8 to 20 parts, especially, 1.2 to 9 parts, more especially, 1.5 to 4 parts, by weight of water, per part by weight of the high boiling water-soluble organic medium in the residual concentrate is added to the residual concentrate obtained in the second step (i.e., a mixture consisting of the high boiling water-soluble organic medium, the dye and the low boiling organic solvent). When water is admixed with the residual concentrate, the mixture separates into an aqueous solution of the high boiling water-soluble organic medium and an organic solvent layer consisting of the low boiling halogenated hydrocarbon and the dye.

It is not advisable to add more than 20 parts of water because the high boiling water-soluble organic medium is diluted to a greater extent thereby incurring the increase of recovery cost on one hand while a part of the dye dissolves in the aqueous solution of the high boiling water-soluble organic medium on the other hand.

It is not advisable, either, to add less than 0.8 parts of water because the concentration of the aqueous solution of the high boiling water-soluble organic medium becomes high with such a consequence that the high boiling water-soluble organic medium partially dissolves in the low boiling organic solvent to result in lowering of the extraction efficiency.

In the fourth step (separation and recovery step), a layer of the aqueous solution of the high boiling water-soluble organic medium is first separated from an organic solvent layer consisting of the low boiling halogenated hydrocarbon and the dye. Any known method can be employed in the present invention for the separation of the two layers. Of these methods, most preferred is a method by the use of a centrifuge. Depending upon types of the high boiling water-soluble organic medium, the low boiling halogenated hydrocarbon and the dye used and other conditions, a layer of precipitated dye is often formed in the proximity of the interface of the two layers formed in the preceeding third step. In such a case, a perfect separation of the aqueous solution of the high boiling water-soluble organic medium from the organic solvent layer consisting of the low boiling halogenated hydrocarbon and the dye becomes relatively more difficult. The use of a centrifuge makes it possible to disperse the dye perfectly into the low boiling halogenated hydrocarbon, and as a result, ensures separation of the two layers completely.

As the centrifuge, known centrifuges can be used without specific limitation such as a batch type or a continuous type. For instance, the centrifuge disclosed in U.S. Pat. No. 3,438,572 can be used conveniently in the present invention since the device facilitates to carry out a continuous and simultaneous centrifuging together with extraction.

After the two layers are perfectly separated from each other by the above-mentioned method, the low boiling halogenated hydrocarbon is recovered by evaporation from the phase consisting of the low boiling halogenated hydrocarbon and the dye while the dye is recovered as the evaporation residue.

In order to reuse the dye thus recovered, it is necessary to perfectly separate the dye from the low boiling halogenated hydrocarbon in the separation and recovery step. The low boiling halogenated hydrocarbon may be separated completely by means of decompression and distillation for this purpose. In order to attain the object in an effective way within a limited period of time, however, it is advisable to remove most of the low boiling halogenated hydrocarbon by evaporation and blow a steam into the dye which still contains a considerable amount of the said hydrocarbon. In this manner the remaining low boiling halogenated hydrocarbon is distilled by the steam, condensed and separated from water to ensure an easy recovery of the dye.

The recovered dye is offered for reuse after, if desired, having been purified by water washing and filtration. Likewise the aqueous solution of the high boiling water-soluble organic medium, if desired, is subjected to decolorization. Decolorization may be conducted effectively by the use of activated carbon and the like.

By evaporating off water from the aqueous solution, the high boiling water-soluble organic medium is obtained. This organic medium is recycled for reuse.

According to the present invention which is performed as described above, the unfixed dye and the high boiling water-soluble organic medium adhering to the dyed fibers can be recovered without discarding them as a result of washing. The low boiling halogenated hydrocarbon used for washing is also recovered for reuse.

This contributes not only to the reduction of the cost, but also to the prevention of environmental pollution.

The present invention will be specifically described by the following non-limitative Examples, in which all parts and percentages are on the weight basis.

EXAMPLE 1

A dye liquor consisting of a fine dispersion containing 50 parts of a dye of the following formula

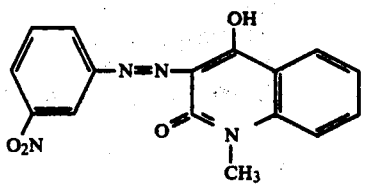 (C.I. 12790)

100 parts of a dye of the following formula

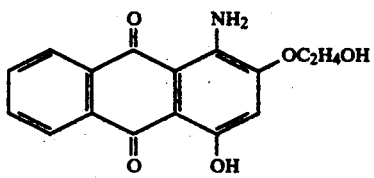

This dye can be formed as follows:

Bromine is added dropwise at 96°–98° C. over a period of 5 hours to a solution of a dye (C.I. 60710) of the following formula

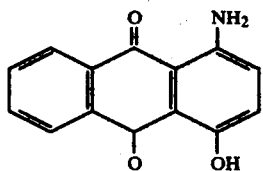

in glacial acetic acid to form an intermediate of the following formula

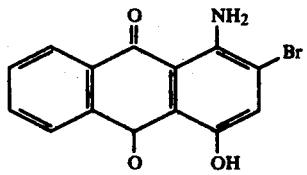

Next, the intermediate was mixed in a solution prepared by adding metallic sodium into ethyleneglycol and the reaction mixture was heated at 150° C. for 2 hours to form a dye of the following formula:

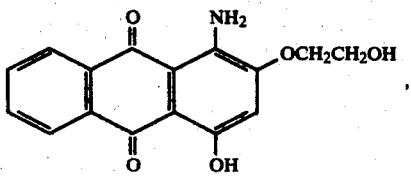

150 parts of a dye of the following formula

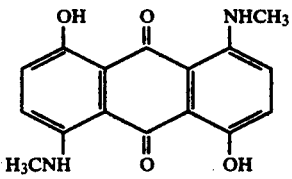 (C.I. 63305)

20 parts of mercapto benzimidazole (antioxidant) and 1680 parts of polyethylene glycol having an average molecular weight of 400 were coated on both surfaces of a woven fabric composed of polyethylene terephthalate yarns using a gravure coater. The amount of the dye liquor coated was 20% based on the weight of the dry fiber (to be abbreviated to o.w.f. hereinafter).

The coated fabric was heated in air for 15 minutes at 180° C. to fix the dye applied. The fabric was then immersed in trichloroethylene at 60° C. for 3 minutes to form a fabric dyed dark reddish blue, using a washing device of the type to be described. The washing apparatus consists of four wash tanks arranged in a continuous manner. The entire apparatus is sealed, and opened into the atmospheric air through a cooling device. Accordingly, leakage of a low boiling organic solvent (to be referred to as wash solvent) to outside the apparatus is completely prevented. Each of the washing tanks is filled with a wash solvent, and the fabric is washed successively through the first to the fourth tanks. A mangle is provided between the adjacent tanks, and the wash solvent picked up by the fabric is squeezed there and returns to the original tank. On the other hand, a clean wash solvent is supplied to the fourth tank, and by overflow, it flows successively through the third, second and first tanks in a direction reverse to the direction of the advance of the fabric, until finally it flows out from the first tank as a wash waste liquor.

The waste liquor contained polyethylene glycol, the unfixed dyes and mercaptobenzimidazole, and was colored in deep shade. The waste liquor was treated in the following manner in accordance with the process of the present invention.

The accompanying drawing is a flow chart showing the sequence of procedures of the present invention.

The wash waste liquor was placed in an evaporation still, and by evaporating trichloroethylene, a ca. 70% solution of trichloroethylene (evaporation residue 30%, trichloroethylene 70%) was obtained. Water (1050 parts) was added to 1500 parts of the concentrate obtained (2.3 parts of water per part of polyethylene glycol), and they were mixed with stirring for 30 minutes at 40° C. The mixture was then subjected to a centrifugal separator to separate it into a light liquid phase consisting of an aqueous solution of the polyethylene glycol (concentration 30%) and a heavy liquid phase consisting of a trichloroethylene solution of the dyes. The light liquid phase contained small amounts of the dyes in the dissolved and dispersed states, and was colored.

To the aqueous solution was added 3%, based on the weight of the filtrate, of powdery activated carbon, and the mixture was stirred at room temperature for 5 hours to decolorize it. Then, the activated carbon was removed by filtration using a filter press. To the resulting filtrate was further added 3% of powdery activated carbon, and the same procedure was repeated to form a colorless aqueous solution of polyethylene glycol (concentration 22.4%). (During this treatment with the activated carbon, mercapto benzimidazole, an antioxidant, was also absorbed and removed.)

Then, this aqueous solution was placed in an evaporation still, and heated at 80° C. and 70 mmHg to evaporate water completely. Colorless polyethylene glycol was recovered. The ratio of recovery, based on the polyethylene glycol contained in the wash waste liquor, was 92% (hereinbelow, the ratio of recovery has the same manning).

On the other hand, by evaporating off trichloroethylene from the heavy liquid phase, a viscous solid evaporation residue was obtained. This residue consisted predominantly of the dyes, and minor amounts of polyethylene glycol.

Vapor of 140° C. at a pressure of 4.5 Kg/cm² was blown into the residue for 2 minutes to remove trichloroethylene perfectly thereby recovering a dye which contained a small amount of polyethylene glycol. The dye could be used again as such.

EXAMPLES 2 TO 7

The procedure of Example 1 was repeated except that the polyethylene glycol was the high boiling water-soluble organic medium and the trichloroethylene as the wash solvent were varied as shown in Table 1, and the washing conditions were changed as shown in Table 1. As a result, the colorless high boiling water-soluble organic media were recovered in the ratios shown in Table 1, and evaporation residues consisting mainly of the dyes were obtained. Since polyethylene glycol having a molecular weight of 2,000 was solid at room temperature, coating was performed at 60° C. in Example 5.

The washing time is the sum of the immersion times in all of the tanks.

Table 1

| Examples Nos. | High boiling water soluble organic media | Washing solvents | Washing conditions Temp. (°C.) | Time (min.) | Ratio of recovery of the high boiling organic media (%) |
|---|---|---|---|---|---|
| 2 | Diethylene glycol | Trichloroethylene | 60 | 2 | 95 |
| 3 | Polyethylene glycol (average molecular weight 200) | 1,1,1-trichloroethane | 60 | 4 | 94 |
| 4 | Polyethylene glycol (average molecular weight 600) | 1,1,1-trichloroethane | 70 | 4 | 94 |
| 5 | Polyethylene glycol (average molecular weight 2000) | Perchloroethylene | 70 | 4 | 91 |
| 6 | Ethyl carbitol | 1,2-difluoro-1,1,2,2-tetrachloroethane | 70 | 4 | 84 |
| 7 | Triethylene glycol dimethyl ether | 1,2-difluoro-1,1,2,2-tetrachloroethane | 70 | 4 | 87 |

EXAMPLE 8

15 Parts of a dye having the following formula

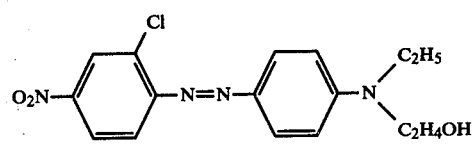

(C.I. 11115)

was uniformly dispersed in an aqueous solution of 225 parts of tetraethylene glycol in 675 parts of water, and a woven fabric composed of nylon-6 filaments was immersed in the resulting dispersion at room temperature. The excessive aqueous solution adhered to the fabric was removed by squeezing (pick-up 50% o.w.f.), and the fabric was heated at 110° C. for 3 minutes to remove moisture. The dried fabric was heated for 40 minutes in steam at 100° C. to fix the dye. The unfixed dye and tetraethylene glycol remained on the fabric.

The fabric was washed with trichloroethylene in the same way as in Example 1 to form a reddish violet-colored fabric and a wash waste liquor. The waste liquor was treated in the same way as in Example 1, and an aqueous solution of tetraethylene glycol was obtained. The aqueous solution was treated with powdery activated carbon, and by evaporating off water in the same way as in Example 1, tetraethylene glycol was recovered in a ratio of 95%.

COMPARATIVE EXAMPLES

The following experiments were conducted to prove that this invention gives unexpected technical advantages as a result of using a specific liquid as a high boiling water-soluble organic medium.

Experiment I

10% by volume perchloroethylene solutions were prepared respectively for 6 high boiling water-soluble organic media of dimethyl formamide (DMF), dimethyl acetoamide (DMAA), diethyl formamide (DEF), polyethylene glycol having an average molecular weight of 2,000 (PEG-2000), polyethylene glycol having an average molecular weight of 4,000 (PEG-4000) and tetraethyleneglycol dimethylether (TEGDME). 100 cc each of the solutions was poured into a distillation flask and distilled. The amount (% by volume) each of the media contained in the fraction at every 20 cc by azeotropy was measured by gas chromatography. The results are shown in Table 2.

Table 2

| Medium | Fraction | | | |
|---|---|---|---|---|
|  | 0–20 cc | 20–40 cc | 40–60 cc | 60–80 cc |
| DMF | 8.15 | 7.90 | 7.60 | 7.85 |
| DMAA | 5.25 | 6.35 | 6.90 | 6.90 |
| DEF | 3.55 | 4.40 | 4.85 | 6.10 |
| PEG-2000 | 0 | 0 | 0 | 0 |
| PEG-4000 | 0 | 0 | 0 | 0 |
| TEGDME | 0 | 0 | 0 | 0 |

Experiment II

10% by volume aqueous solutions were prepared respectively for the same 6 media as used in Experiment I. 100 cc each of the solutions was poured into a distillation flask and distilled. The amount (% by volume) each of the media contained in the fraction at every 20 cc by azeotropy was measured by gas chromatography. The results are shown in Table 3.

Table 3

| Medium | Fraction | | | |
|---|---|---|---|---|
| | 0–20 cc | 20–40 cc | 40–60 cc | 60–80 cc |
| DMF | 2.90 | 3.60 | 5.00 | 6.70 |
| DMAA | 1.55 | 3.45 | 6.85 | 7.10 |
| DEF | 7.70 | 8.90 | 9.15 | 7.05 |
| PEG-2000 | 0 | 0 | 0 | 0 |
| PEG-4000 | 0 | 0 | 0 | 0 |
| TEGDME | 0 | 0 | 0 | 0 |

From the above Experiments, it is found that, in distillation (evaporation) of a system which is coexistent with perchloroethylene or water, the DMF, DMAA or DEF forms an azeotrope with perchloroethylene or water, while the medium of this invention (PEG-2000, PEG-4000 and TEGDME) does not form the azeotrope with perchloroethylene or water. This indicates that according to this invention recovery of the medium can be attained at low cost without causing pollution.

What we claim is:

1. A method for treating a wash waste liquor, which comprises (a) continuously treating fibers which have been dyed by applying a dye liquor containing a solution or dispersion of a non-ionic disperse or oil-soluble dye in a high boiling water-soluble organic medium selected from the group consisting of polyalkylene glycols and alkyl ether of polyalkylene glycols or a mixture of said polyalkylene glycol or alkyl ether of polyalkylene glycol with a low boiling medium selected from the group consisting of water and halogenated hydrocarbons, with a washing medium consisting essentially of a low boiling halogenated hydrocarbon capable of dissolving the high boiling water-soluble organic medium thereby to continuously wash out the unfixed dye and the high boiling water-soluble organic medium remaining on the surfaces of the fibers; (b) concentrating the wash waste liquor from step (a) comprised of the low boiling halogenated hydrocarbon and the unfixed dye and high boiling water-soluble organic medium dissolved therein by evaporating the low boiling halogenated hydrocarbon contained therein until the content of said halogenated hydrocarbon in the residual concentrate becomes substantially 30 to 90% by weight; (c) mixing the resulting concentrate consisting of the high boiling water-soluble organic medium, the dye and the low boiling halogenated hydrocarbon with 0.8 to 20 parts by weight of water, per part by weight of the high boiling water-soluble organic medium in the residual concentrate to extract the high boiling water-soluble organic medium, thereby to separate it into a phase consisting of an aqueous solution of the high boiling water-soluble organic medium and a phase consisting of the low boiling halogenated hydrocarbon and the dye dissolved or dispersed therein; (d) thereafter separating the two phases, recovering the low boiling halogenated hydrocarbon by evaporation and obtaining the dye as residue from the phase consisting of the low boiling halogenated hydrocarbon and the dye; and (e) removing the remaining low boiling halogenated hydrocarbon from the residue by blowing steam into the dye-containing residue and boiling the remaining low boiling halogenated hydrocarbon together with water.

2. The method as defined in claim 1 wherein the high boiling water-soluble organic medium is a polyalkylene glycol.

3. The method as defined in claim 1 wherein the low boiling halogenated hydrocarbon is trichloroethylene or 1,1,1-trichloroethane.

4. The method as defined in claim 1 wherein a centrifuging is employed for the separation of the phase consisting of an aqueous solution of the high boiling water-soluble organic medium from the phase consisting of the low boiling halogenated hydrocarbon and the dye dissolved or dispersed therein.

5. The method as defined in claim 1 for treating a wash waste liquor which further comprises (f) decolorizing an aqueous solution of the high boiling water-soluble organic medium obtained in step (d) with activated carbon, and then (g) evaporating off water to recover the organic medium.

* * * * *

UNITED STATES PATENT AND TRADEMARK OFFICE
CERTIFICATE OF CORRECTION

PATENT NO. : 4,165,217
DATED : August 21, 1979
INVENTOR(S) : KITAMURA, ET AL.

It is certified that error appears in the above-identified patent and that said Letters Patent are hereby corrected as shown below:

After item [30] insert -- May 10, 1972 Japan.......45340/72 --

Signed and Sealed this

Fourth Day of December 1979

[SEAL]

Attest:

SIDNEY A. DIAMOND

Attesting Officer

Commissioner of Patents and Trademarks